United States Patent [19]
Citta et al.

[11] Patent Number: 6,002,691
[45] Date of Patent: Dec. 14, 1999

[54] DYNAMIC SEARCH TREE FOR RESOLUTION OF CONTENTION BETWEEN TRANSMITTING STATIONS

[75] Inventors: Richard W. Citta, Oak Park; Jingsong Xia, Mundelein, both of Ill.

[73] Assignee: Zenith Electronics Corporation, Glenview, Ill.

[21] Appl. No.: 08/734,908

[22] Filed: Oct. 22, 1996

[51] Int. Cl.[6] .................................... H04J 3/00
[52] U.S. Cl. ........................... 370/447; 370/461
[58] Field of Search ................... 370/442, 443, 370/444, 447, 347, 348, 321, 322, 461, 458

[56] References Cited

U.S. PATENT DOCUMENTS

| | | | |
|---|---|---|---|
| 4,907,224 | 3/1990 | Scoles et al. | 370/443 |
| 5,303,234 | 4/1994 | Kou | 370/461 |
| 5,384,777 | 1/1995 | Ahmadi et al. | 370/443 |
| 5,590,131 | 12/1996 | Kabatepe | 370/461 |
| 5,615,212 | 3/1997 | Ruszczyk et al. | 370/433 |

*Primary Examiner*—Min Jung

[57] ABSTRACT

In a contention resolution system for use in connection with transmitting and receiving data over a communication medium, a first station determines a contention based variable E for a future upstream data frame. The variable E indicates a number of resolution slots (i) which result from expansion of a contention slot of a previous upstream data frame containing contention between the second station and other stations, and (ii) within which previously contending data may be re-transmitted by the second station. The first station inserts the variable E in a downstream data frame for transmission over the communication medium to the second station. The second station receives the variable E from the downstream data frame. The second station randomly selects one of the E resolution slots, and the second station inserts the previously contending data in the randomly selected resolution slot for re-transmission in an upstream data frame.

51 Claims, 6 Drawing Sheets

DYNAMIC SEARCH TREE FOR RESOLUTION OF CONTENTION BETWEEN TRANSMITTING STATIONS

TECHNICAL FIELD OF THE INVENTION

The present invention relates to a search tree which is used to resolve contention which arises when two or more stations of a communication system transmit in the same data frame slot.

BACKGROUND OF THE INVENTION

Communication systems typically include a plurality of stations connected to one another over a communication medium. For example, in a community antenna television (CATV) system, a headend and a plurality of subscriber stations communicate over a cable. The cable supports downstream communication from the headend to the subscriber stations and upstream communication from the subscriber stations to the headend. Data, which is transmitted between the headend and the subscriber stations, is transmitted in data frames. Accordingly, when the headend communicates with a subscriber station, the headend transmits a downstream data frame to the subscriber station, and when a subscriber station communicates with the headend, the subscriber station transmits an upstream data frame to the headend.

In such a CATV system, the headend and the subscriber stations must share the resources of the cable in some manner. For example, downstream and upstream communications are typically allocated to different frequency ranges. In a sub-split allocation, downstream communications are allocated to a frequency range between 54 MHz and 750 MHz and above, while the upstream communications are allocated to a frequency range below 42 MHz. In a mid-split allocation, downstream communications are allocated to a frequency range of 162 MHz and above, while upstream communications are allocated to a frequency range between 5 to 100 MHz. In a high-split allocation, downstream communications are allocated to a frequency range of 234 MHz and above, while upstream communications are allocated to a frequency range between 5 MHz and 174 MHz.

Moreover, the subscriber stations must also share the resources of the cable in some manner. In a time division multiple access (TDMA) CATV system, the subscriber stations typically share the cable by transmitting data during uniquely assigned and non-overlapping time periods. In a frequency division multiple access (FDMA) CATV system, the subscriber stations share the cable by dividing up the available upstream frequency bandwidth into numerous narrow frequency channels and by allocating to each subscriber station its own uniquely corresponding narrow frequency band. In a code division multiple access (CDMA) CATV system, the subscriber stations share the cable by multiplying their data messages by corresponding assigned code words and then transmitting the result.

A TDMA system, which assigns each subscriber station to a unique time slot, avoids collisions of data transmitted by the subscriber stations but restricts the amount of data throughput from the subscriber stations to the headend. An FDMA system, which allocates to each subscriber station its own uniquely corresponding narrow frequency band, similarly restricts throughput because the number of frequency bands allocated to the subscriber stations is limited. A CDMA system likewise limits throughput over a communication cable because the number of code words which are available to be assigned to subscriber stations is limited.

In order to increase throughput of the data transmitted by the subscriber stations to the headend of a CATV system, it is known to allow the subscriber stations to contend for the same frequency, time, or code word slots in the upstream data frame and to use a tree algorithm to resolve any resulting contention. Contention is created when two or more subscriber stations transmit data in the same slot or slots of an upstream data frame. When the headend detects such contention, the headend initiates a tree algorithm which assigns, for a second layer of contention, a predetermined number of resolution contention slots in the next upstream data frame for each contention slot in the previous upstream data frame in which there was contention. In other words, the tree algorithm expands each contention slot in which there was contention to a predetermined number of resolution contention slots.

Each subscriber station determines whether it transmitted in one of the contention slots in which there was contention. Each subscriber station, which determines that it transmitted in a contention slot in which there was contention, randomly selects one of the resolution contention slots corresponding to the contention slot of the previous upstream data frame in which it transmitted data. These subscriber stations then re-transmit their data in the corresponding randomly selected resolution contention slots. If the headend again detects contention, the tree algorithm assigns, for a third layer of contention, a predetermined number of resolution contention slots in the next upstream data frame for each previous resolution contention slot in the previous upstream data frame in which there was contention. The contending subscriber stations respond as before. In this way, contention is resolved.

There are several problems with this approach. For example, there is no estimation of the number of subscriber stations which transmitted colliding data so that the contention slots in which contention occurred are merely expanded to a predetermined number of resolution contention slots. Expanding the contention slots in which contention occurred to a predetermined number of resolution contention slots is not an optimum method of reducing contention because many iterations are required until all subscriber stations are able to successfully transmit their data. These iterations add excessive delay to the transmission of data, and result in excessive power being transmitted into the expanded contention slots over a long period of time which thereby saturates the communication medium and causes noise in adjacent channels.

The present invention is directed to a dynamic search tree which is used to resolve contention that arises when two or more stations of a communication system transmit in the same contention slot and which solves one or more of the above described problems.

SUMMARY OF THE INVENTION

In accordance with one aspect of the present invention, a station for transmitting data in a slot over a communication medium comprises a receiving means, a slot selecting means, and an inserting means. The receiving means receives a downstream data message. The downstream data message includes a slot portion indicating E resolution slots within which data may be transmitted by the station in a future upstream data message, and E is variable. The slot selecting means selects one of the E resolution slots. The inserting means inserts data in the selected resolution slot.

In accordance with another aspect of the present invention, a station for transmitting data in a slot over a communication medium comprises a receiving means, a slot selecting means, and an inserting means. The receiving means receives a downstream data message. The downstream data message includes a slot and message allocation portion, and the slot and message allocation portion indicates layer-dependent E resolution slots within which data may be transmitted by the station. The slot and message allocation portion allocates the E resolution slots to a designated future upstream message, and E is variable and has a value dependent upon a layer of contention. The slot selecting means selects one of the E resolution slots. The inserting means inserts data in the selected resolution slot of the designated future upstream message.

In accordance with yet another aspect of the present invention, a system for transmitting and receiving data over a communication medium comprises a determining means at a first station, an inserting means at the first station, a receiving means at a second station, a selecting means at the second station, and an inserting means at the second station. The determining means at the first station determines E for a future upstream data message, wherein E indicates a number of resolution slots within which data may be re-transmitted by the second station, and wherein E is variable and has a value dependent upon a layer of contention. The inserting means at the first station inserts a parameter dependent upon E in a downstream data message for communication over the communication medium to the second station. The receiving means at the second station receives the parameter dependent upon E from the downstream data message. The selecting means at the second station randomly selects one of the E resolution slots. The inserting means at the second station inserts data to be re-transmitted in the randomly selected resolution slot of an upstream data message.

In accordance with still another aspect of the present invention, a method of transmitting and receiving data over a communication medium comprises the following steps: a) at a first station, determining E for a future upstream data message, wherein E indicates a number of resolution slots within which data may be transmitted by a second station, and wherein E is variable; b) at the first station, inserting E in a downstream data message for transmission over a communication medium to the second station; c) at the second station, receiving E from the downstream data message; d) at the second station, randomly selecting one of the E resolution slots; and, e) at the second station, inserting data in the randomly selected slot for re-transmission in an upstream data message.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
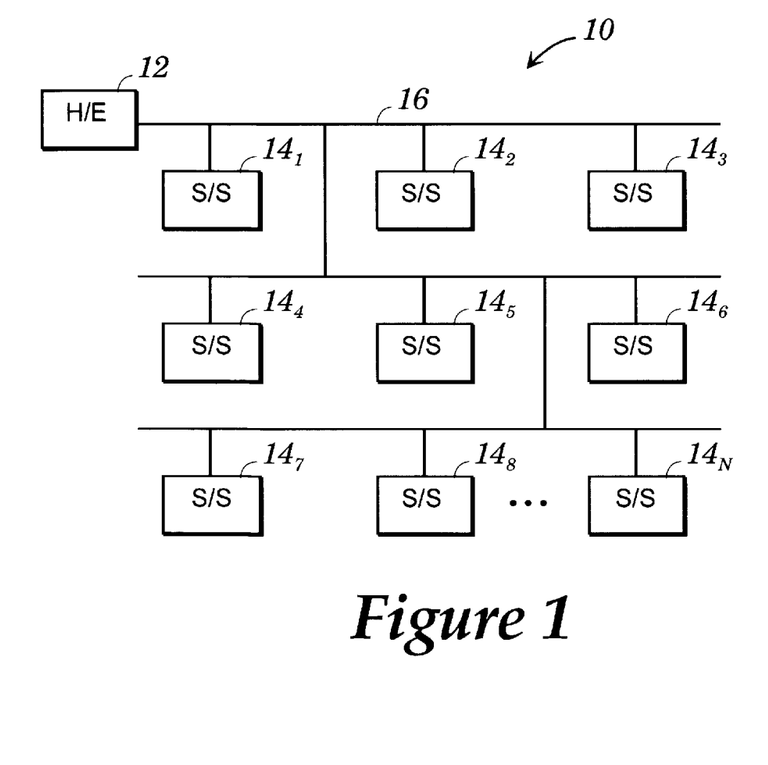
FIG. 1 is a schematic diagram of a CATV system which includes a headend connected to a plurality of subscriber stations by way of a cable and which is exemplary of a communication system configured in accordance with the present invention.

FIG. 1 illustrates a CATV system 10 which includes a headend 12, a plurality of subscriber stations $14_1$–$14_n$, and a cable 16 which interconnects the headend 12 and the subscriber stations $14_1$–$14_n$. The headend 12 may be of conventional hardware design incorporating a processor which may be programmed to support downstream communication over the cable 16 in accordance with the present invention. Similarly, the subscriber stations $14_1$–$14_n$ may be of conventional hardware design each incorporating a processor which may be programmed to support upstream communications over the cable 16 in accordance with the present invention.

According to the present invention, when the subscriber stations $14_1$–$14_n$ have data to communicate to the headend 12 over the cable 16, those subscriber stations generate a random number between one and $SLOT_{MAX}$. $SLOT_{MAX}$ is the highest numbered contention slot in the next upstream data frame, such as data frame F1, and is either fixed or is inferred from the previous downstream data frame. A contention slot is a slot for which the subscriber stations $14_1$–$14_n$ may contend in the transmission of data to the headend 12.

Figure 2:
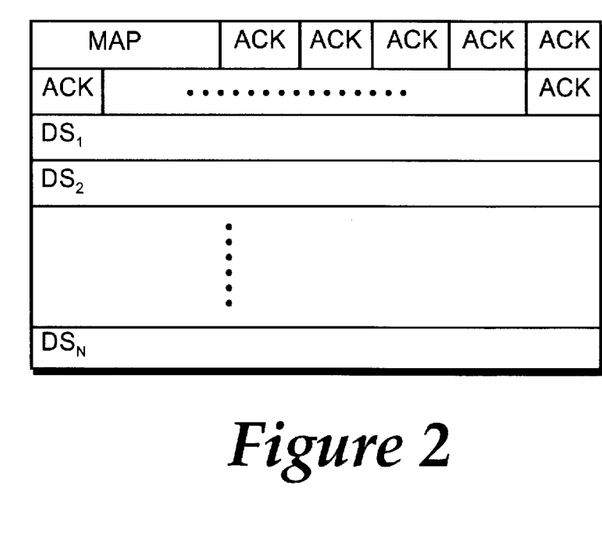
FIG. 2 illustrates a downstream data frame transmitted by the headend to the subscriber stations of FIG. 1.

An exemplary downstream data frame is illustrated in FIG. 2. Each such downstream data frame has at least three sections. The first section of the downstream data frame contains a slot parameter MAP. The slot parameter MAP may be a number (e.g., $SLOT_{MAX}$) which is equal to the number of contention slots in the next upstream data frame. Alternatively, the slot parameter MAP may be a map which defines the slots of the next upstream data frame. The advantage of a map is that, if the upstream data frames contains slots other than contention slots, the map allows the contention slots and the other slots to be dispersed throughout the upstream data frame. The subscriber stations $14_1$–$14_n$ can determine which slots in the upstream data frames are contention slots and which are other slots by the map. As a further alternative, the slot parameter MAP may be a boundary between contention slots and other slots. In this case, the contention slots are segregated from the other slots.

The second section of the downstream data frame is devoted to the acknowledgement of data transmitted by the subscriber stations $14_1$–$14_n$ to the headend 12 in a previous upstream data frame. The third section of the downstream data frame contains slots which may be used by the headend 12 to communicate data to the subscriber stations $14_1$–$14_n$.

Figure 3:
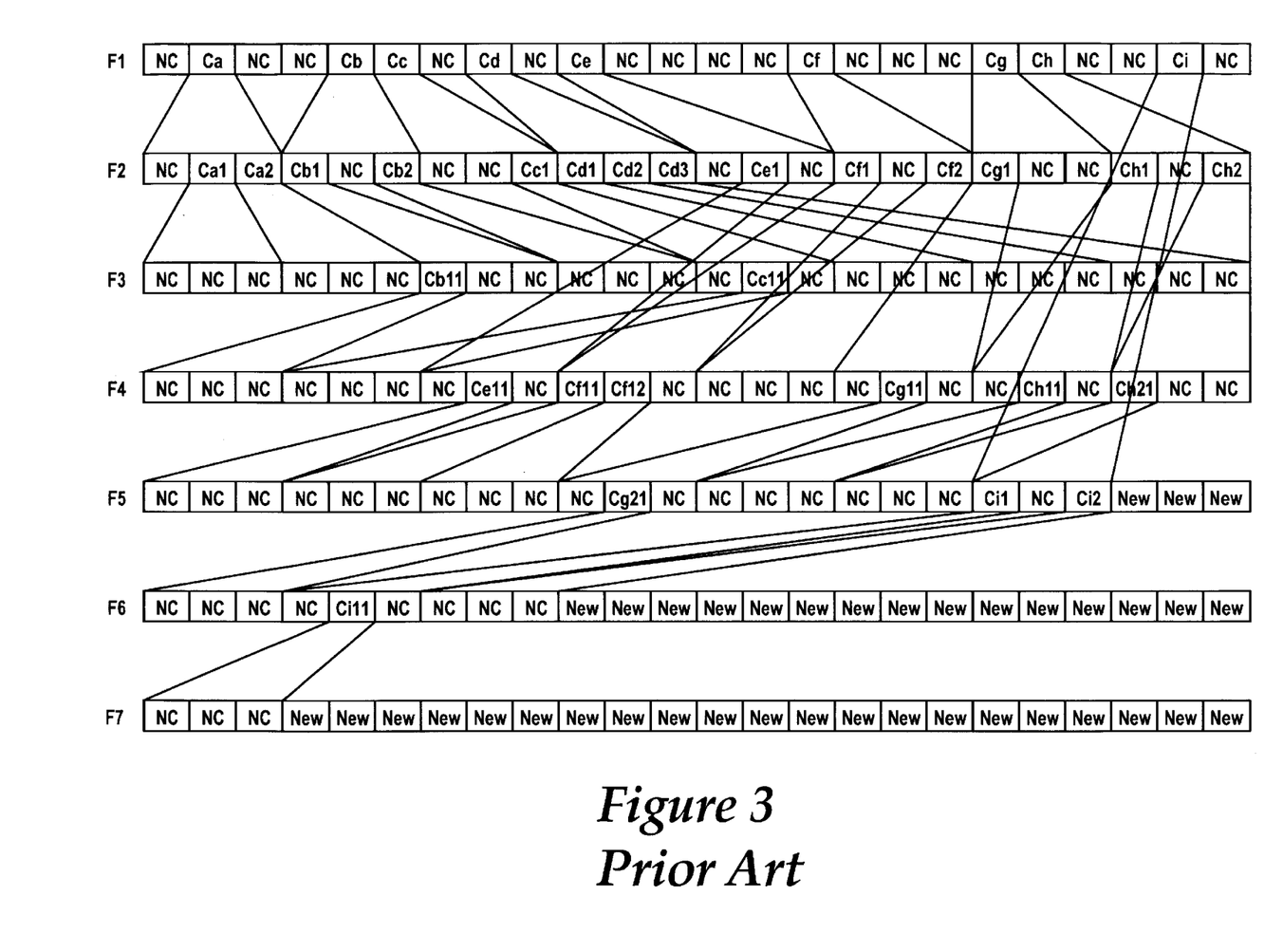
FIG. 3 illustrates an example of contention slots in upstream data frames F1–F7 according to a prior art tree algorithm.

In determining the slot parameter MAP, the headend 12 has in the past used a tree algorithm with a fixed slot expansion regardless of the current layer of contention of the CATV system 10. FIG. 3 illustrates, by way of example, the operation of this prior art tree algorithm. With no contention in a previous upstream data frame, the subscriber stations $14_1$–$14_n$ are allowed to contend for any of the contention slots in the next upstream data frame. The upstream data frame F1 in FIG. 3 shows a first layer of contention. The contention slots in which no contention occurred are labelled NC, and the contention slots in which contention occurred are labelled C with a lower case letter to distinguish between such contention slots.

Accordingly, the headend 12 expands each of the contention slots in which contention occurred by an expansion coefficient E of three. The slot parameter MAP is based upon the expansion coefficient E. As a result of this expansion, the headend 12 expands each of the contention slots in which contention occurred to three corresponding resolution contention slots for a second layer of contention. For example, the contention slot Ca is expanded to three resolution contention slots, the contention slot Cb is expanded to three resolution contention slots, the contention slot Cc is expanded to three resolution contention slots, and so on. The resolution contention slots to which the contention slots of the first layer of contention are expanded are contention slots for a second layer of contention. Thus, as shown by the upstream data frame F2, a second layer of contention may result. For example, one of the three resolution contention slots to which the contention slot Ca was expanded contains no contention, and the other two of these three resolution contention slots (Ca1 and Ca2) contain contention. Similarly, one of the three resolution contention slots to which the contention slot Cb was expanded contains no contention, and the other two of these three resolution slots (Cb1 and Cb2) contain contention.

The headend 12 then expands each of the resolution contention slots of the second layer of contention in which contention occurred to three corresponding resolution contention slots for a third layer of contention. For example, the contention slot Cb1 is expanded to three resolution contention slots for the third layer of contention with the result that two of these three resolution contention slots contain no contention, and the other of these three resolution contention slots (Cb11) contain contention.

As indicated by FIG. 3, the expansion coefficient E of the prior art tree algorithm is fixed. As discussed above, expanding the contention slots in which contention occurred by a fixed expansion coefficient is not an optimum way of reducing contention. For example, expanding the contention slots, in which contention occurred, by a fixed expansion coefficient requires many iterations until all subscriber stations are able to successfully transmit their data. These iterations add excessive delay to the transmission of data. These iterations also result in excessive power being transmittted into the expanded contention slots over a long period of time which thereby saturates the communication medium and causes noise in adjacent channels.

Figure 4:
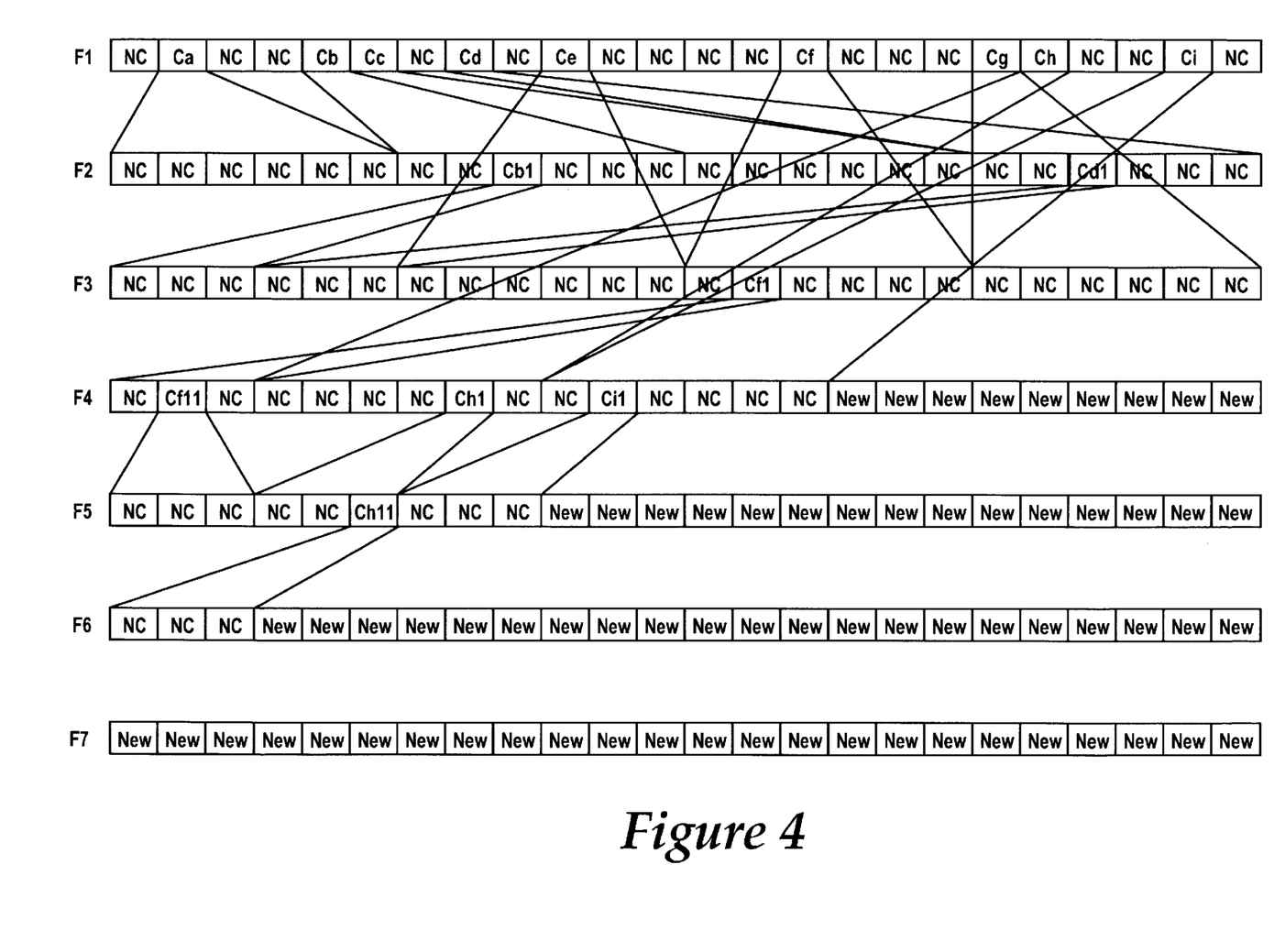
FIG. 4 illustrates an example of contention slots in upstream data frames F1–F7 according to the present invention.

The present invention expands the contention slots in which contention occurs by an expansion coefficient E that is variable and that depends upon the amount of contention. FIG. 4 illustrates, by way of example, the operation of the present invention. With no contention in a previous upstream data frame, the subscriber stations $14_1$–$14_n$ are allowed to contend for any of the contention slots in the next upstream data frame. The upstream data frame F1 in FIG. 3 shows the result of a first layer of contention. Accordingly, the headend 12 expands each of the contention slots, in which contention occurs during the first layer of contention, by an expansion coefficient E of six. This value (six) for E of the expansion coefficient is dependent upon the amount of contention in the upstream data frame F1. Thus, the headend 12 expands each of the contention slots in which contention occurred to six corresponding resolution contention slots for a second layer of contention. For example, the contention slot Ca is expanded to six resolution contention slots with the result that, in the second layer of contention, all of these six resolution contention slots contain no contention. Similarly, the contention slot Cb is expanded to six resolution contention slots with the result that, in the second layer of contention, one of these six resolution contention slots (Cb1) contains contention, and the other five of these six resolution contention slots contain no contention.

It is noted that, because of a limited number of contention slots in an upstream data frame, there may be occasions in which not all of the contention slots of the first layer of contention may be expanded into the same next upstream data frame. Accordingly, for example, the contention slot Cf from the upstream data frame F1 is expanded to six resolution contention slots for the second layer of contention in an upstream data frame F3 instead of in the upstream data frame F2. One of these six resolution contention slots (Cf1) contains contention, and the other five of these three resolution contention slots contain no contention.

It is also noted that an upstream data frame may contain resolution contention slots of different layers of contention. For example, the contention slot Cg from the upstream data frame F1 representing a first layer of contention is expanded to six resolution contention slots in the upstream data frame F3, whereas the contention slot Cb1 from the upstream data frame F2 representing a second layer of contention is expanded to three resolution contention slots also in the upstream data frame F3.

As is discussed in more detail hereinafter, the expansion coefficient E is set by the headend 12 according to the present invention in response to the number of contending subscriber stations $14_1$–$14_n$. FIG. 4 illustrates that the expansion coefficient E set by the headend 12 according to the present invention may be varied between layers of contention. Thus, if the amount of contention in the second layer of contention is reduced sufficiently, the value of E will be reduced.

Figure 5:
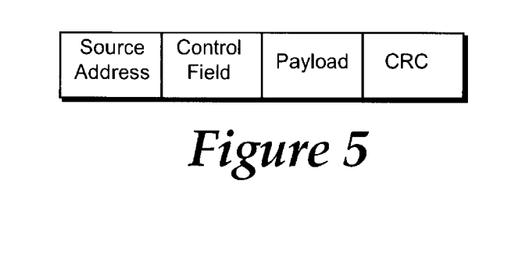
FIG. 5 illustrates a slot format of the upstream data frame.

FIG. 5 illustrates the data which is inserted into a contention slot by a subscriber station. This data includes a source address representing the address of the sending subscriber station, a control field, a payload, and error checking data. The control field may indicate a message identifier which identifies the type of message transmitted by the subscriber station.

Figure 6:
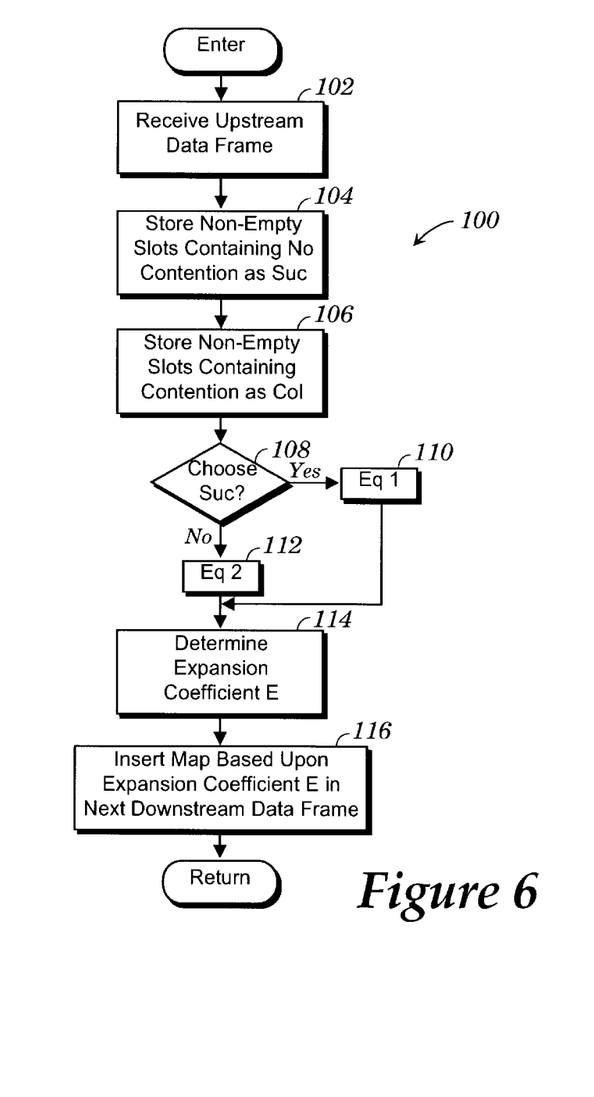
FIG. 6 illustrates a program which is executed by the headend of FIG. 1 in an exemplary implementation of the present invention.

In determining the slot parameter MAP, which is used by the subscriber stations $14_1$–$14_n$ to determine if they can transmit data, the processor of the headend 12 executes a program 100 which is illustrated in FIG. 6.

The program 100 is entered each time that an upstream data frame is received by the headend 12. When the program 100 is entered, a block 102 receives an upstream data frame. A block 104 analyzes the received upstream data frame to determine which non-empty contention slots therein contain non-contending data. These contention slots are contention slots which contain data from only one subscriber station. The block 104 sets a parameter SUC equal to the number of these contention slots. A block 106 also analyzes the received upstream data frame to determine which non-empty contention slots therein contain contending data. These contention slots are contention slots which contain data from more than one subscriber station. The block 106 sets a parameter COL equal to the number of these contention slots.

Thereafter, a block 108 chooses whether to calculate the number of active stations based upon the parameter SUC. If so, a block 110 determines the number of active stations N from the following equation:

$$SUC = TS \frac{N}{TS-1} \left( \frac{TS-1}{TS} \right)^N \quad (1)$$

wherein N is the number of active stations, wherein TS is a total number of contention slots in an upstream data frame, and wherein SUC is the number of non-empty contention slots in an upstream data frame in which contention did not occur as determined by the block 104.

Figure 7:
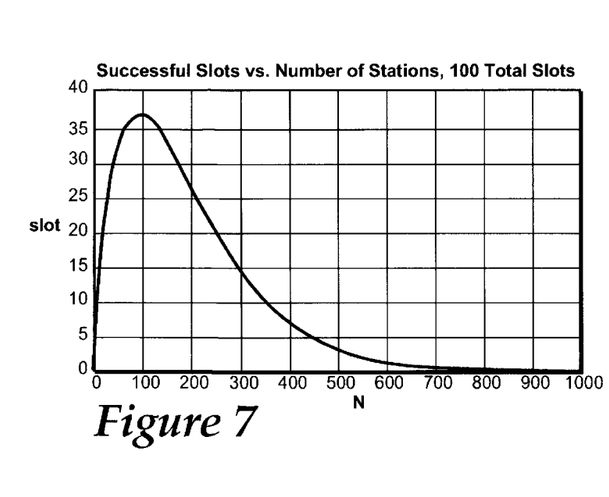
FIGS. 7–10 are graphs useful in explaining the program of FIG. 6.

Alternatively, the number of active stations N may be determined by the block 110 from a lookup table which is stored in memory at the headend 12 according to the graph shown in FIG. 7. This graph corresponds to equation (1). The vertical axis of this graph is the input axis. The parameter SUC as determined by the block 104 is input along the vertical axis. The horizontal axis is the output axis along which the number of active stations N is determined as a function of the input vertical axis. When using the graph of FIG. 7, an ambiguity arises because there are two output values along the horizontal axis for each input along the vertical axis. This ambiguity may be resolved by the use of the collision curve shown in FIG. 8. This curve is explained in more detail below.

On the other hand, if the block 108 chooses not to calculate the number of active stations based upon the parameter SUC, a block 112 determines the number of active stations N from the following equation:

$$COL = TS - TS \frac{N}{TS-1} \left( \frac{TS-1}{N} \right)^N - TS \left( \frac{TS-1}{TS} \right)^N \quad (2)$$

wherein N is the number of active stations, wherein TS is a total number of contention slots in an upstream data frame, and wherein COL is the number of contention slots which are in an upstream data frame just received and in which contention occurred as determined by the block 106.

Figure 8:
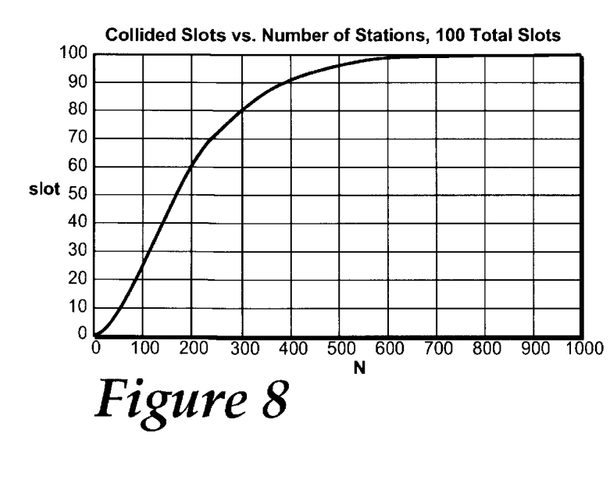

Alternatively, the number of active stations N may be determined from a lookup table which is stored in memory at the headend 12 according to the graph shown in FIG. 8. This graph corresponds to equation (2). The vertical axis of this graph is the input axis. The parameter COL as determined by the block 106 is input along the vertical axis. The horizontal axis is the output axis along which the number of active stations N is determined as a function of the vertical axis.

The block 108 may make its decision based upon a user set flag or upon other criteria. On the other hand, it should be apparent that the CATV system 10 can be arranged to determine the number of active stations N exclusively from equation (1). If so, the blocks 106, 108, and 112 may be eliminated. Alternatively, the CATV system 10 can be arranged to determine the number of active stations N exclusively from equation (2). If so, the blocks 104, 108, and 110 may be eliminated. As a further alternative, the number of active stations N can be determine from a combination of the parameter SUC and the parameter COL.

Figure 9:
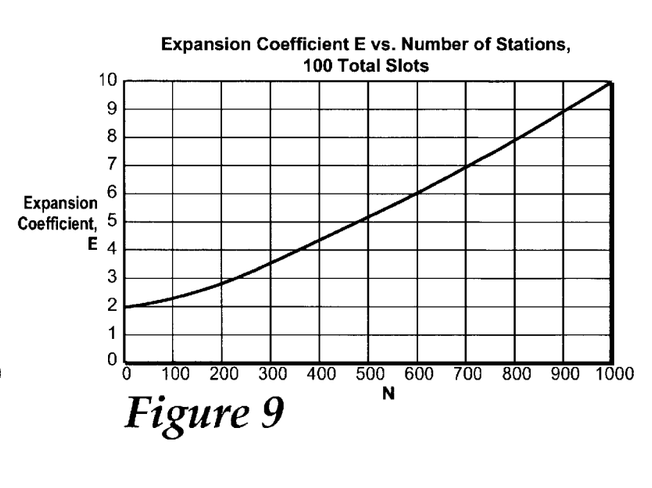

A block 114 uses the number of active stations N in order to determine the expansion parameter E according to a lookup table which is stored in memory at the headend 12 and which conforms to the graph shown in FIG. 9. The horizontal axis of this graph is the input axis. The number of active stations N, as determined by one of the methods described above, is input along the horizontal axis. The vertical axis is the output axis along which the expansion parameter E is determined as a function of the horizontal axis.

Figure 10:
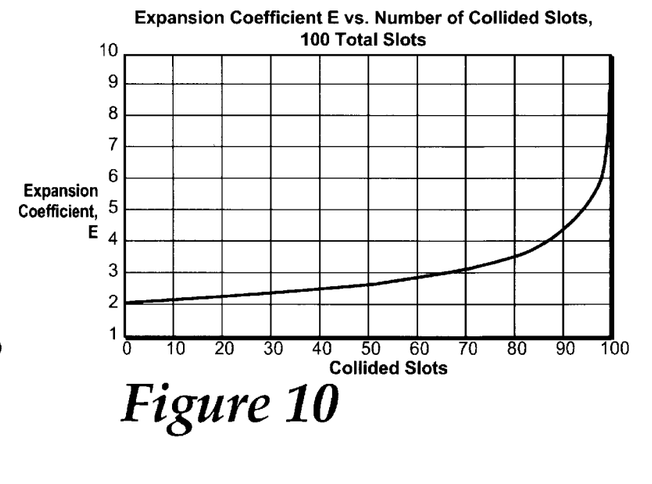

Alternatively, the block 114 may determine the expansion parameter E according to a lookup table which is stored in memory at the headend 12 and which conforms to the graph shown in FIG. 10. The horizontal axis of this graph is the input axis. The parameter COL as determined by the block 106 is input along the horizontal axis. The vertical axis is the output axis along which the expansion parameter E is determined as a function of the horizontal axis. If a look up table conforming to FIG. 10 is used, the blocks 104, 108, 110, and 112 may be eliminated.

A block 116 determines the contention slots in the upstream data frame just received that require expanding. These contention slots contain data from more than one subscriber station. The block 116 also determines the parameter MAP, which may be a map of the next upstream data frame. This map designates (i) the contention slots from the previous upstream data frame that are expanded, (ii) designates the resolution contention slots in the next upstream data frame which correspond to each expanded contention slot from the previous upstream data frame and which are based upon the expansion coefficient E, (iii) the future upstream data frame containing these resolution contention slots because, as discussed above, the next upstream data frame may not be able to contain all of the resolution contention slots, or because it may not otherwise be desirable to place all of the resolution contention slots in the next upstream data frame, and (iv) the remaining contention slots in the next upstream data frame, if any, which may be used by subscriber stations to transmit new data, i.e., data not previously transmitted.

Finally, the block 116 inserts the parameter MAP into the next downstream data frame to be transmitted. Thereafter, the program 100 returns to the block 102 to await the next upstream data frame.

Figure 11:
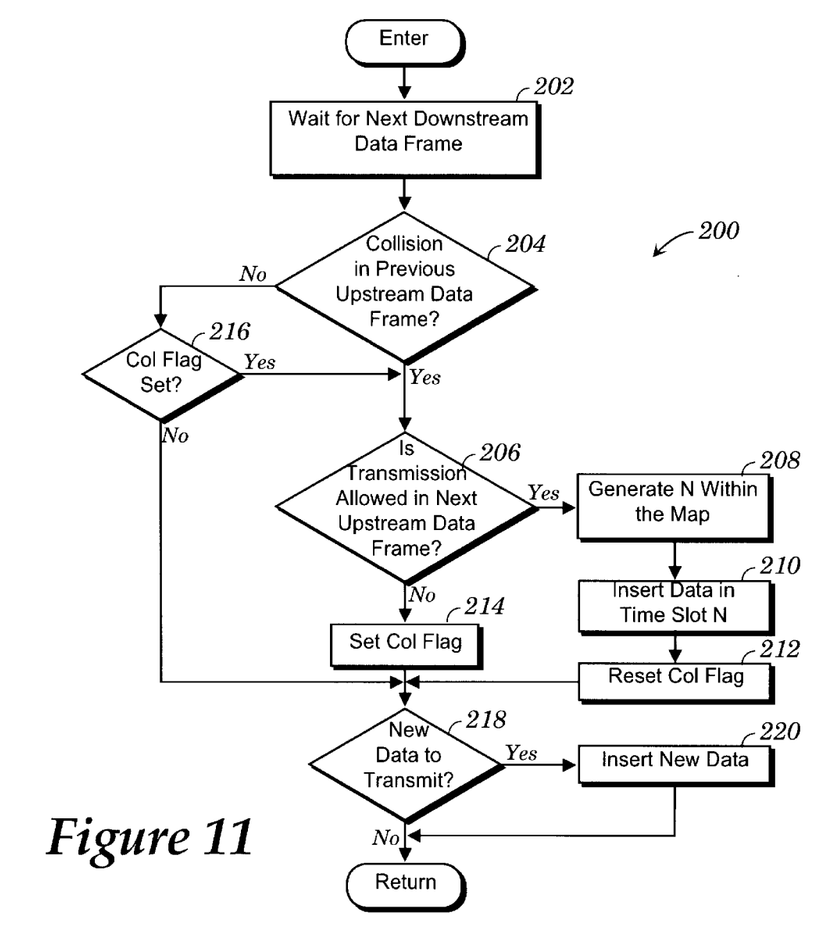
FIG. 11 illustrates a program which is executed by each of the subscriber stations of FIG. 1 in the exemplary implementation of the present invention.

Each of the subscriber stations $14_1$–$14_n$ executes a program 200 as shown in FIG. 11. When the program 200 is entered, a block 202 causes its corresponding subscriber station to wait for the next downstream data frame (which contains the parameter MAP). When the next downstream data frame is received, a block 204 determines from the parameter MAP whether its corresponding subscriber station, and one or more other subscriber stations, transmitted data in the same contention slot of the previous upstream data frame, i.e., whether the data transmitted by its corresponding subscriber station collided with data transmitted by one or more other subscriber stations. The block 204 can make this determination by comparing the contention slot in which its corresponding subscriber station transmitted data in the previous upstream data frame to the contention slots that are expanded in the parameter MAP.

If the block 204 determines that its corresponding subscriber station, and one or more other subscriber stations, transmitted data in the same contention slot of the previous upstream data frame, a block 206 determines, from the parameter MAP, the identity of the next upstream data frame in which the corresponding subscriber station is allowed to re-transmit its previously contending data. If the block 206 determines that its corresponding subscriber station is permitted to re-transmit its previously contending data in the next upstream data frame, the block 206 determines that re-transmission of the data is allowed.

Accordingly, a block 208 generates a random number R within the range of the resolution contention slots assigned to its corresponding subscriber station. That is, the random number R is generated so that it equals one of the resolution contention slots corresponding to the contention slot in which the corresponding subscriber station transmitted contending data in the previous upstream data frame. A block 210 then inserts the previously contending data in the contention slot R of the next upstream data frame for transmission. A block 212 resets a COL flag.

If the block 206 determines that its corresponding subscriber station is not permitted to re-transmit its previously contending data in the next upstream data frame (i.e., its corresponding subscriber station has been assigned a later upstream data frame in which it is allowed to re-transmit its previously contending data), a block 214 sets the COL flag.

If the block 204 determines that its corresponding subscriber station, and one or more other subscriber stations, did not transmit data in the same contention slot of the previous upstream data frame, a block 216 determines whether the COL flag is set. As indicated by the block 214, the COL flag is set when the subscriber station has not successfully transmitted data but it is not permitted to re-transmit this data in the next upstream data frame. Accordingly, during a subsequent pass through the program 200, the block 216 allows block 206 to determine if the subscriber station can now re-transmit its previously contending data. If the COL flag is set, program flow passes to the block 206. If the COL flag is not set as determined by the block 216, or after the block 214 sets the COL flag, or after the block 212 resets the COL flag, a block 218 determines whether its corresponding subscriber station has new data to transmit. If the block 218 determines that its corresponding subscriber station has new data to transmit, a block 220 generates a random number X within the range which corresponds to the non-resolution contention slots in the next upstream data frame as defined by the parameter MAP. The block 220 then inserts the new data in the contention slot X of the next upstream data frame for transmission. If the block 218 determines that its corresponding subscriber station has no new data to transmit, or after the block 214 inserts the new data in the contention slot X, the program 200 returns to the block 202 to await the next downstream data frame.

Accordingly, the dynamic search tree of the present invention estimates the number of subscriber stations transmitting colliding data. The contention slots in which contention occurred are expanded by an amount dependent upon the number of subscriber stations transmitting colliding data. Thus, contention reduction is enhanced and the number of iterations required to reduce contention is materially lessened, which reduces delay in the transmission of data and the power being transmitted into the expanded slots.

Certain modifications of the present invention have been discussed above. Other modifications will occur to those practicing in the art of the present invention. For example, as described above, the cable 16 interconnects the headend 12 and the subscriber stations $14_1$–$14_n$. However, the headend 12 and the subscriber stations $14_1$–$14_n$ may be interconnected by any communication medium such as a twisted pair, a fiber optic cable, over the air, by way of satellite, and/or the like.

Also, as described above, the number of active stations N can be determined from the parameters SUC and/or COL. However, the number of active stations N can be determined instead from the number of empty of slots (i.e., a parameter EMP) in a previous upstream data frame, or by a combination of the parameters EMP, SUC, and/or COL.

Moreover, as described above, the expansion coefficient E is re-determined for each layer of contention. Instead, the expansion coefficient E may be determined according to a first level of contention, and may thereafter be reduced by fixed amounts for subsequent layers of contention.

In addition, each contention slot, which is in one layer of contention and which contains contending data from more than one subscriber station, is expanded by the same expansion coefficient E to the next layer of contention. However, it is possible, in accordance with the present invention, to expand contention slots in one layer of contention by differing expansion coefficients to resolution contention slots in the next layer of contention.

Furthermore, the present invention has been described above in the context of a CATV system. It should be understood, however, that the present invention is useful in a wide variety of communication systems.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A station comprising:
    a) a receiver arranged to receive a downstream data message following a data collision in a contention slot of a previous upstream data message, wherein the downstream data message indicates E resolution slots within which data transmitted in the contention slot may be re-transmitted by the station in a future upstream data message, and wherein E is a variable number;
    b) a slot selector arranged to select one of the E resolution slots; and,
    c) a data inserter arranged to insert the data in the selected resolution slot.

2. The station of claim 1 wherein E is based upon a number of active stations.

3. The station of claim 2 wherein the number of active stations is determined by the following equation:

$$COL = TS - TS\frac{N}{TS-1}\left(\frac{TS-1}{N}\right)^N - TS\left(\frac{TS-1}{TS}\right)^N$$

wherein N is the number of active stations, wherein TS is a total number of contention slots in an upstream data message, and wherein COL is a number of contention slots in an upstream data message in which contention occurred.

4. The station of claim 2 wherein the number of active stations is determined from a lookup table generally corresponding to the following equation:

$$COL = TS - TS\frac{N}{TS-1}\left(\frac{TS-1}{N}\right)^N - TS\left(\frac{TS-1}{TS}\right)^N$$

wherein N is the number of active stations, wherein TS is a total number of contention slots in an upstream data message, and wherein COL is a number of contention slots in an upstream data message in which contention occurred.

5. The station of claim 2 wherein the number of active stations is determined by the following equation:

$$SUC = TS\frac{N}{TS-1}\left(\frac{TS-1}{TS}\right)^N$$

wherein N is the number of active stations, wherein TS is a total number of contention slots in an upstream data message, and wherein SUC is a number of contention slots in an upstream data message which contain data but in which contention did not occur.

6. The station of claim 2 wherein the number of active stations is determined from a lookup table generally corresponding to the following equation:

$$SUC = TS\frac{N}{TS-1}\left(\frac{TS-1}{TS}\right)^N$$

wherein N is the number of active stations, wherein TS is a total number of contention slots in an upstream data message, and wherein SUC is a number of contention slots in an upstream data message which contain data but in which contention did not occur.

7. The station of claim 1 wherein E is based upon a number of contention slots in an upstream data message in which contention occurred.

8. The station of claim 1 wherein E is based upon a number of contention slots in an upstream data message which contain data but in which contention did not occur.

9. The station of claim 1 wherein the slot selector is arranged to randomly select one of the E resolution slots, and wherein the data inserter is arranged to insert the data in the randomly selected resolution slot.

10. The station of claim 9 wherein E is based upon a number of active stations.

11. The station of claim 9 wherein E is based upon a number of contention slots in an upstream data message in which contention occurred.

12. The station of claim 9 wherein E is based upon a number of contention slots in an upstream data message which contain data but in which contention did not occur.

13. The station of claim 1 wherein the E resolution slots resulted from expansion of the contention slot of the previous upstream data message in which the second station transmitted data.

14. A station comprising:
   a) a receiver arranged to receive a downstream data message following a data collision in a contention slot of a previous upstream data message in which the station transmitted data that collided with data from at least one other station, wherein the downstream data message includes a slot and message allocation portion, wherein the slot and message allocation portion indicates layer-dependent E resolution slots within which data transmitted in the contention slot may be re-transmitted by the station, wherein the slot and message allocation portion allocates the E resolution slots to a designated future upstream message, wherein the E resolution slots resulted from expansion of the contention slot, and wherein E is a variable number which has a value dependent upon a layer of resolution contention;
   b) a slot selector arranged to select one of the E resolution slots; and,
   c) a data inserter arranged to insert the data in the selected resolution slot of the designated future upstream message.

15. The station of claim 14 wherein E is based upon a number of active stations and varies by layer of contention.

16. The station of claim 15 wherein the number of active stations is determined by the following equation:

$$COL = TS - TS\frac{N}{TS-1}\left(\frac{TS-1}{N}\right)^N - TS\left(\frac{TS-1}{TS}\right)^N$$

wherein N is the number of active stations, wherein TS is a total number of contention slots in an upstream data message, and wherein COL is a number of contention slots in an upstream data message in which contention occurred.

17. The station of claim 15 wherein the number of active stations is determined from a lookup table generally corresponding to the following equation:

$$COL = TS - TS\frac{N}{TS-1}\left(\frac{TS-1}{N}\right)^N - TS\left(\frac{TS-1}{TS}\right)^N$$

wherein N is the number of active stations, wherein TS is a total number of contention slots in an upstream data message, and wherein COL is a number of contention slots in an upstream data message in which contention occurred.

18. The station of claim 15 wherein the number of active stations is determined by the following equation:

$$SUC = TS\frac{N}{TS-1}\left(\frac{TS-1}{TS}\right)^N$$

wherein N is the number of active stations, wherein TS is a total number of contention slots in an upstream data message, and wherein SUC is a number of contention slots in an upstream data message which contain data but in which contention did not occur.

19. The station of claim 15 wherein the number of active stations is determined from a lookup table generally corresponding to the following equation:

$$SUC = TS\frac{N}{TS-1}\left(\frac{TS-1}{TS}\right)^N$$

wherein N is the number of active stations, wherein TS is a total number of contention slots in an upstream data message, and wherein SUC is a number of contention slots in an upstream data message which contain data but in which contention did not occur.

20. The station of claim 14 wherein E is based upon a number of contention slots in an upstream data message in which contention occurred and varies by layer of contention.

21. The station of claim 14 wherein E is based upon a number of contention slots in an upstream data message which contain data but in which contention did not occur and varies by layer of contention.

22. The station of claim 14 wherein the slot selector is arranged to randomly select one of the E resolution slots, and wherein the data inserter is arranged to insert the data in the randomly selected resolution slot.

23. The station of claim 22 wherein E is based upon a number of active stations and varies by layer of contention.

24. The station of claim 22 wherein E is based upon a number of contention slots in an upstream data message in which contention occurred and varies by layer of contention.

25. The station of claim 22 wherein E is based upon a number of contention slots in an upstream data message which contain data but in which contention did not occur and varies by layer of contention.

26. The station of claim 14 wherein E has a first value as a result of a first layer of contention, wherein E has a second value as a result of a second layer of contention, and wherein the first and second values are different.

27. The station of claim 26 wherein the first value of E is greater than the second value of E.

28. The station of claim 26 wherein the first value of E is based upon a number of contention slots in an upstream data message in which contention occurred during the first layer of contention, and wherein the second value of E is based upon a number of contention slots in an upstream data message in which contention occurred during the second layer of contention.

29. The station of claim 26 wherein the first value of E is based upon a number of contention slots which contain data but in which contention did not occur in an upstream data message during the first layer of contention, and wherein the second value of E is based upon a number of contention slots which contain data but in which contention did not occur in an upstream data message during the second layer of contention.

30. The station of claim 26 wherein the slot selector is arranged to randomly select one of the E resolution slots, and wherein the data inserter is arranged to insert the data in the randomly selected resolution slot.

31. The station of claim 30 wherein the first value of E is based upon a number of active stations in an upstream data message which was transmitted by the station during the first layer of contention, and wherein the second value of E is based upon a number of active stations in an upstream data message which was transmitted by the station during the second layer of contention.

32. The station of claim 30 wherein the first value of E is based upon a number of contention slots in which contention occurred in an upstream data message that was transmitted by the station during the first layer of contention, and wherein the second value of E is based upon a number of contention slots in which contention occurred in an upstream data message that was transmitted by the station during the second layer of contention.

33. The station of claim 30 wherein the first value of E is based upon a number of contention slots which contain data but in which contention did not occur in an upstream data message which was transmitted by the station during the first layer of contention, and wherein the second value of E is based upon a number of contention slots which contain data but in which contention did not occur in an upstream data message which was transmitted by the station during the second layer of contention.

34. A system comprising:
  a) determining means at a first station for determining E resolution slots within which data may be re-transmitted by a second station following transmission of the data by the second station in a contention slot of a first upstream data message, and wherein E is a variable number having a value dependent upon a layer of contention;
  b) transmitting means at the first station for transmitting to the second station a downstream data message indicating the resolution slots for a second upstream data message;
  c) receiving means at the second station for receiving the downstream data message;
  d) selecting means at the second station for randomly selecting one of the E resolution slots indicated by the downstream data message; and,
  e) inserting means at the second station for inserting data to be re-transmitted in the randomly selected resolution slot of the second upstream data message.

35. The system of claim 34 wherein the determining means determines E based upon a number of active stations and upon a layer of contention.

36. The system of claim 35 wherein the determining means determines the number of active stations by the following equation:

$$COL = TS - TS \frac{N}{TS-1}\left(\frac{TS-1}{N}\right)^N - TS\left(\frac{TS-1}{TS}\right)$$

wherein N is the number of active stations, wherein TS is a total number of contention slots in the first upstream data message, and wherein COL is a number of contention slots in the first upstream data message in which contention occurred.

37. The system of claim 35 wherein the determining means determines the number of active stations from a lookup table generally corresponding to the following equation:

$$COL = TS - TS \frac{N}{TS-1}\left(\frac{TS-1}{N}\right)^N - TS\left(\frac{TS-1}{TS}\right)$$

wherein N is the number of active stations, wherein TS is a total number of contention slots in the first upstream data message, and wherein COL is a number of contention slots in the first upstream data message in which contention occurred.

38. The system of claim 35 wherein the determining means determines the number of active stations by the following equation:

$$SUC = TS \frac{N}{TS-1}\left(\frac{TS-1}{TS}\right)^N$$

wherein N is the number of active stations, wherein TS is a total number of contention slots in the first upstream data message, and wherein SUC is a number of contention slots in the first upstream data message which contain data but in which contention did not occur.

39. The system of claim 35 wherein the determining means determines the number of active stations from a lookup table generally corresponding to the following equation:

$$SUC = TS \frac{N}{TS-1}\left(\frac{TS-1}{TS}\right)^N$$

wherein N is the number of active stations, wherein TS is a total number of contention slots in the first upstream data message, and wherein SUC is a number of contention slots in the first upstream data message which contain data but in which contention did not occur.

40. The system of claim 34 wherein the determining means determines E based upon (i) a number of contention slots in the first upstream data message in which contention occurred and (ii) a layer of contention.

41. The system of claim 34 wherein the determining means determines E based upon (i) a number of contention slots which contain data but in which contention did not occur in the first upstream data message and (ii) a layer of contention.

42. The system of claim 34 wherein the selecting means comprises means for randomly selecting one of the E resolution slots, and wherein the inserting means at the second station comprises means for inserting data in the randomly selected resolution slot.

43. The system of claim 42 wherein the determining means determines E based upon (i) a number of active stations and (ii) a layer of contention.

44. The system of claim 42 wherein the determining means determines E based upon (i) a number of contention slots in which contention occurred in the first upstream data message and (ii) a layer of contention.

45. The system of claim 42 wherein the determining means determines E based upon (i) a number of contention slots which contain data but in which contention did not occur in the first upstream data message and (ii) a layer of contention.

46. The system of claim 34 wherein the determining means determines E as a first value as a result of a first layer of contention, and wherein the determining means determines E as a second value as a result of a second layer of contention.

47. The system of claim 46 wherein the determining means determines the first value of E as a value which is greater than the second value of E.

48. The system of claim 46 wherein the determining means determines the first value of E based upon a number of contention slots in the first upstream data message in which contention occurred during the first layer of contention, and wherein the determining means determines the second value of E based upon a number of contention slots in the first upstream data message in which contention occurred during the second layer of contention.

49. The system of claim 46 wherein the determining means determines the first value of E based upon a number of contention slots which contain data but in which contention did not occur in the first upstream data message during the first layer of contention, and wherein the determining means determines the second value of E based upon a number of contention slots which contain data but in which contention did not occur in the first upstream data message during the second layer of contention.

50. The system of claim 46 wherein the selecting means comprises means for randomly selecting one of the E resolution slots, and wherein the inserting means comprises means for inserting data in the randomly selected resolution slot.

51. A method of transmitting and receiving data over a communication medium comprising the following steps:

a) at a first station, determining E resolution slots expanded from a contention slot of a first upstream data message in which data transmitted by a second station collided with data transmitted by at least one other station, and wherein E is a variable number;

b) at the first station, transmitting a downstream data message to the second station, wherein the downstream data message indicates the resolution slots for a second upstream data message;

c) at the second station, receiving the downstream data message;

d) at the second station, randomly selecting one of the resolution slots indicated by the received downstream data message; and, e) at the second station, inserting data in the randomly selected resolution slot for re-transmission in the second upstream data message.

\* \* \* \* \*